F. BADE.
ROCK DRILLING MACHINE.
APPLICATION FILED MAY 19, 1911.
1,087,706.
Patented Feb. 17, 1914.
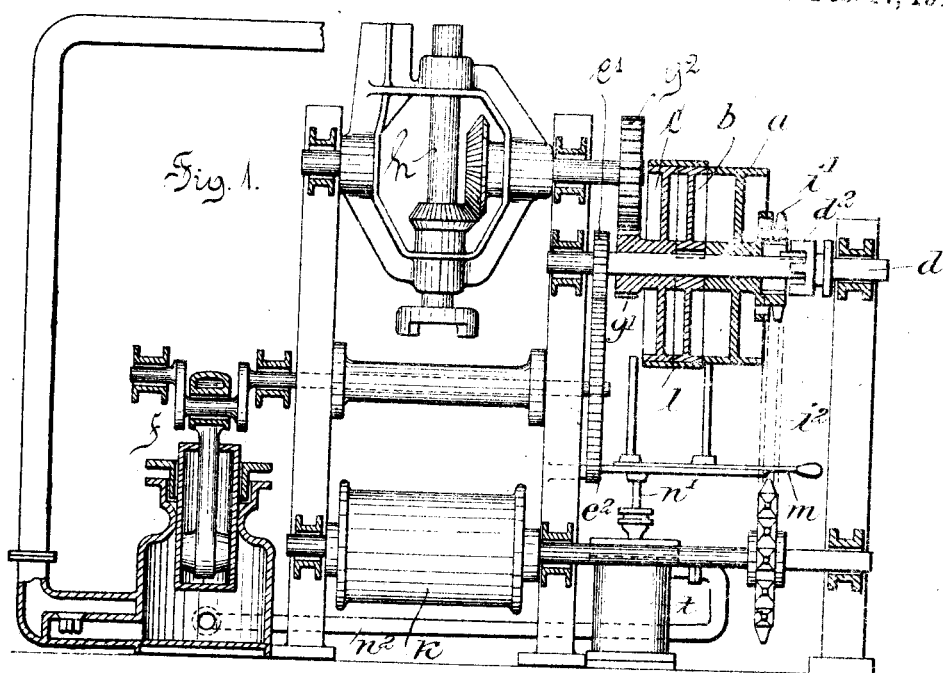
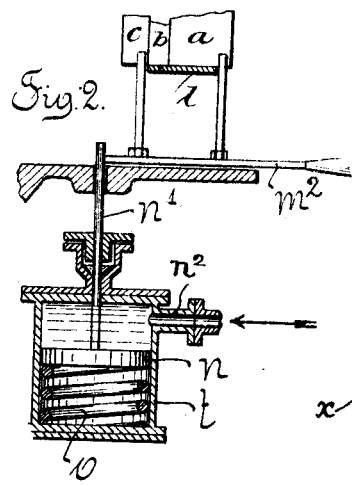
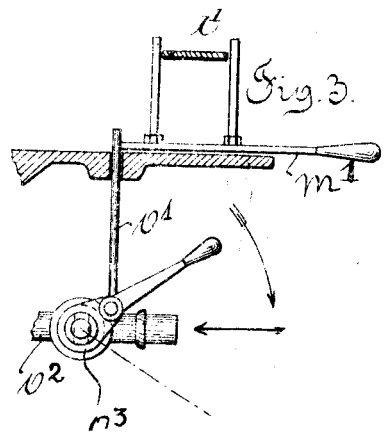
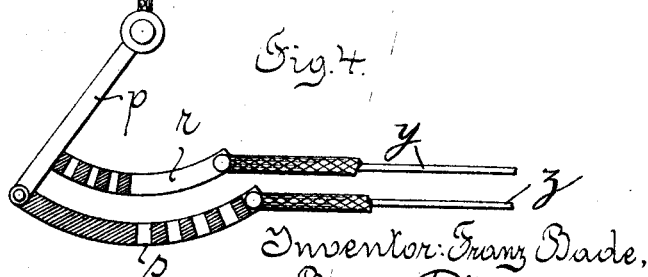
Witnesses:
C. H. Walter,
Hany Pausch
Inventor: Franz Bade,
By R. H. Adam
Attorney.

UNITED STATES PATENT OFFICE.

FRANZ BADE, OF PEINE, GERMANY.

ROCK-DRILLING MACHINE.

1,087,706.      Specification of Letters Patent.      Patented Feb. 17, 1914.

Application filed May 19, 1911.  Serial No. 628,283.

*To all whom it may concern:*

Be it known that I, FRANZ BADE, a subject of the Emperor of Germany, residing at Peine, in Germany, have invented certain new and useful Improvements in Rock-Drilling Machines, of which the following is a specification.

In boring test-holes and performing similar operations with diamond or toothed drills it is of prime importance to insure that a good stream of water always plays upon the drill while the latter is working, but it is also desirable that the supply of water is available, and can be directed upon the bore-hole for cleansing purposes, while the drill is not at work.

The object of the present invention is to provide means for this purpose.

The invention is illustrated in the accompanying drawing, in which—

Figure 1 is an elevation of a drilling machine with pump, partly in section. Fig. 2 is a sectional view of an auxiliary device for use in connection with the construction shown in Fig. 1. Fig. 3 shows another modification of the device, and Fig. 4 shows an electric switch adapted for the purposes of the invention.

The machine shown in Fig. 1 has three pulleys $a$, $b$, $c$. The pulley $a$ is normally loose on the shaft $d$, but is fixed to the sprocket wheel $i^1$ connected by chain $i^2$ to the shaft of the winch drum $k$, so that the latter can be actuated by clutching the pulley $a$ to the shaft for the purpose of traversing the drill. A clutch $d^2$ is indicated in Fig. 1 for this purpose. The pulley $b$ is fixed to the shaft $d$ and serves for actuating the pump $f$ by means of toothed gears $e^1$ $e^2$. The pulley $c$ is loose on the shaft $d$ and serves for actuating the boring spindle $h$ by means of gears $g^1$ and $g^2$. The widths of the several pulleys and the driving belt $l$ are so proportioned that the belt can work on the pulley $a$ alone and can drive the pulley $b$ while partly resting on the pulley $a$, but can never be shifted clear of the pulley $b$ onto the pulley $c$; that is to say, the pulley $b$ must be driven while the pulley $c$ is driven. The pump is used to direct a stream of water onto the drill through a pipe located in a suitable position, and the arrangement described insures that the pump is always started before the drill.

Fig. 2 shows a device for temporarily checking the shifting of the belt by the belt-shifter $m^2$ after the pump has been started but before the belt has reached the pulley $c$, the object of this device being to insure that the pump is not only being driven, but is actually playing upon the drill, before the latter is started.

The checking device comprises the rod $n^1$ which is fixed to the piston $n$ working in the cylinder $t$. The spring $o$ normally thrusts the rod $n^1$ into the path of the belt-shifter $m$, at the point at which the latter is about to shift the belt on to the pulley $c$, but when the pump is delivering it forces water through the port $n^2$ into the cylinder $t$, and the water depresses the piston, thus withdrawing the rod from the path of the belt-shifter.

It is not essential to combine a pump with the drilling machine, if equivalent means are available for supplying a stream of cooling liquid, as for example a pipe connected to a main, controlled by a valve which must be opened before the actuating mechanism of the drill can be thrown into gear. A modification of this kind is illustrated in Fig. 3, in which $o^2$ is the supply pipe, $o^3$ the controlling valve and $o^1$ the rod for checking the belt-shifter $m^1$ before the latter can shift the belt $l^1$ on to the drill actuating pulley. The rod $o^1$ is connected to the valve, so that by the act of opening the latter the rod is withdrawn from the path of the belt-shifter.

In an electrically actuated drilling machine the circuits of the pump and the drill actuating mechanism may be controlled by a switch as shown in Fig. 4. In this figure $x$ represents the main feeder, $y$ and $z$ being wires leading to the motors of the pump and drill respectively. By moving the switch arm $p$ to the right, connection is first made through the contact bar $r$ to the pump motor, and then through the contact bar $s$ to the drill motor.

What I claim as my invention and desire to secure by Letters Patent of the United States is:—

In a rock drilling machine the combination of a drill, drill actuating mechanism, a device for starting said drill actuating mechanism, means for supplying liquid to the drill, a device for controlling said liquid supplying means disposed so that said controlling device must be actuated for procural of liquid supply prior to operation of the device for starting the drill actuating mechanism, and a check for said starting device adapted to be disabled by the action of the liquid supply.

In witness whereof I have signed this specification in the presence of two witnesses.

FRANZ BADE.

Witnesses:
 CARL GRAVEGER,
 CARL DELING.